United States Patent
Na

(10) Patent No.: US 9,696,792 B2
(45) Date of Patent: Jul. 4, 2017

(54) DIGITAL DEVICE AND METHOD FOR CONTROLLING THE SAME

(71) Applicant: LG ELECTRONICS INC., Seoul (KR)

(72) Inventor: Sangjun Na, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 13/839,517

(22) Filed: Mar. 15, 2013

(65) Prior Publication Data
US 2014/0007000 A1   Jan. 2, 2014

(30) Foreign Application Priority Data
Jun. 29, 2012  (KR) .................... 10-2012-0070941

(51) Int. Cl.
| | |
|---|---|
| G06F 3/00 | (2006.01) |
| G06F 3/01 | (2006.01) |
| G06F 3/0338 | (2013.01) |
| G06F 3/038 | (2013.01) |
| G06F 3/0484 | (2013.01) |
| G06F 3/0354 | (2013.01) |

(52) U.S. Cl.
CPC ............... G06F 3/01 (2013.01); G06F 3/038 (2013.01); G06F 3/0338 (2013.01); G06F 3/03545 (2013.01); G06F 3/0484 (2013.01); G06F 2203/0384 (2013.01)

(58) Field of Classification Search
USPC ......................................................... 715/778
See application file for complete search history.

(56) References Cited

U.S. PATENT DOCUMENTS

| | | | | |
|---|---|---|---|---|
| 7,027,881 | B2 * | 4/2006 | Yumoto et al. | 700/65 |
| 7,853,241 | B1 * | 12/2010 | Harrison | 455/406 |
| 8,099,289 | B2 * | 1/2012 | Mozer | G10L 15/30 704/270 |
| 2002/0143817 | A1 * | 10/2002 | Dutta | G09B 21/001 715/234 |

(Continued)

FOREIGN PATENT DOCUMENTS

| | | |
|---|---|---|
| CN | 1685394 A | 10/2005 |
| CN | 1777929 A | 5/2006 |

(Continued)

OTHER PUBLICATIONS

Detriodborg, "Apple Remote App (iPad): Demo," Retrieved from the Internet: URL:http://www.youtube.com/watch?v=UvEpgcE9KCs, Uploaded on Oct. 14, 2010, 1 page, XP054975326.

Primary Examiner — Hien Duong
(74) Attorney, Agent, or Firm — Birch, Stewart, Kolasch & Birch, LLP

(57) ABSTRACT

A digital device and a method for controlling the same are disclosed herein. Herein, a digital device having its display turned off may include a user input receiver receiving a user input, a controller performing control operations, so as to configure a virtual page, wherein the virtual page includes at least one or more unique functions and applications of the digital device, and to execute a predetermined function in accordance with a user selection, and an output unit outputting the configured virtual page and outputting data respective to the execution of the predetermined function.

20 Claims, 12 Drawing Sheets

(56) References Cited

U.S. PATENT DOCUMENTS

| | | | |
|---|---|---|---|
| 2002/0152144 A1* | 10/2002 | Kamper | G06Q 40/04 705/35 |
| 2002/0191029 A1* | 12/2002 | Gillespie | G06F 3/0488 715/810 |
| 2003/0234763 A1* | 12/2003 | Hejza Litwiller | G06F 3/167 345/156 |
| 2007/0024593 A1* | 2/2007 | Schroeder | G06F 3/0421 345/173 |
| 2007/0208687 A1* | 9/2007 | O'Conor | G06F 17/30899 |
| 2008/0005432 A1* | 1/2008 | Kagawa | 710/106 |
| 2008/0020803 A1* | 1/2008 | Rios | H04M 1/667 455/565 |
| 2008/0189115 A1* | 8/2008 | Mayer-Ullmann | G06F 9/4443 704/275 |
| 2009/0023389 A1 | 1/2009 | Paryani | |
| 2009/0187950 A1* | 7/2009 | Nicas | G10L 13/00 725/56 |
| 2009/0284468 A1* | 11/2009 | Takaki | G06F 3/0482 345/157 |
| 2009/0312059 A1* | 12/2009 | Pratt | H04W 52/0264 455/566 |
| 2009/0328101 A1* | 12/2009 | Suomela | H04N 5/44543 725/40 |
| 2010/0162182 A1 | 6/2010 | Oh et al. | |
| 2010/0261506 A1* | 10/2010 | Rajamani | H04M 1/7253 455/566 |
| 2010/0262673 A1* | 10/2010 | Chang | G06F 3/1454 709/217 |
| 2010/0277337 A1 | 11/2010 | Brodersen et al. | |
| 2011/0072373 A1* | 3/2011 | Yuki | 715/764 |
| 2011/0173539 A1* | 7/2011 | Rottler | G06F 3/167 715/727 |
| 2011/0191516 A1* | 8/2011 | Xiong et al. | 710/305 |
| 2011/0223899 A1 | 9/2011 | Hiraide | |
| 2011/0223974 A1* | 9/2011 | Agevik | G06F 1/1626 455/566 |
| 2012/0218477 A1* | 8/2012 | Shahal | G08C 17/00 348/734 |
| 2013/0111345 A1* | 5/2013 | Newman | G06F 1/3265 715/716 |
| 2013/0111579 A1* | 5/2013 | Newman | G06F 3/0488 726/17 |
| 2013/0145396 A1* | 6/2013 | Sung | G06F 1/3203 725/40 |
| 2013/0157721 A1* | 6/2013 | Nystrom | G01B 7/003 455/566 |
| 2013/0166292 A1* | 6/2013 | Van Sciver | G10L 15/22 704/235 |
| 2014/0196119 A1* | 7/2014 | Hill | G06F 21/32 726/4 |

FOREIGN PATENT DOCUMENTS

| | | |
|---|---|---|
| CN | 201479277 U | 5/2010 |
| CN | 102037437 A | 4/2011 |
| CN | 102081473 A | 6/2011 |
| CN | 102356555 A | 2/2012 |
| CN | 102460367 A | 5/2012 |
| WO | WO 2004/059422 A2 | 7/2004 |
| WO | WO 2010074468 A2 * | 7/2010 |

* cited by examiner

FIG. 1
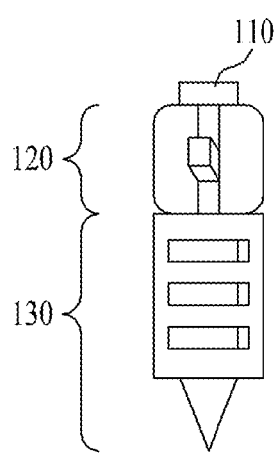
(a)
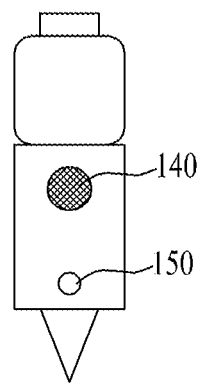
(b)
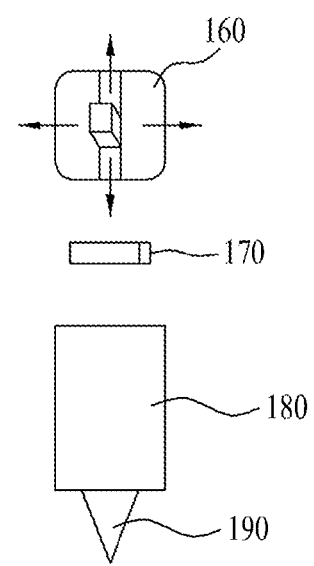
(c)

FIG. 5
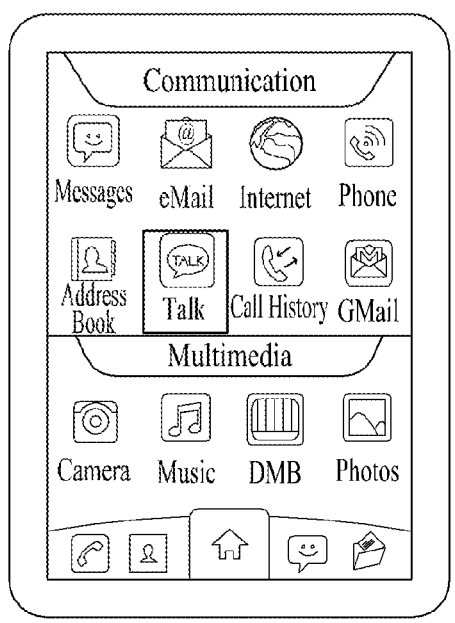
(a)
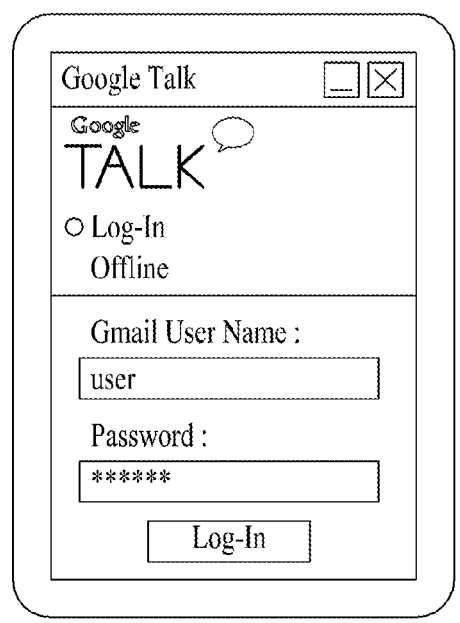
(b)

FIG. 6
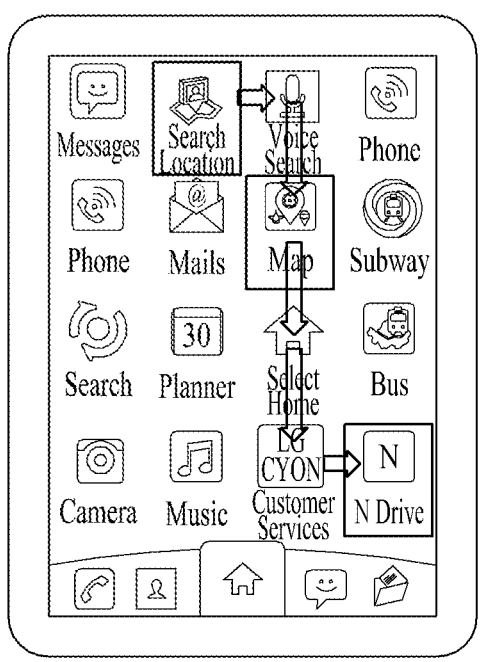
(a)
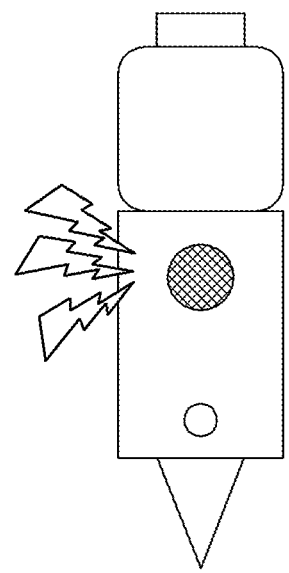
(b)

FIG. 9
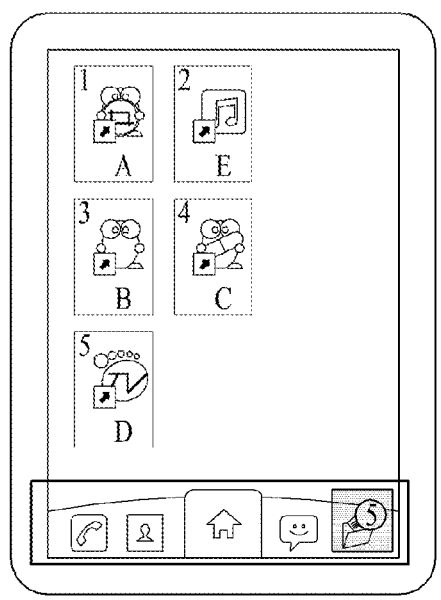
(a)
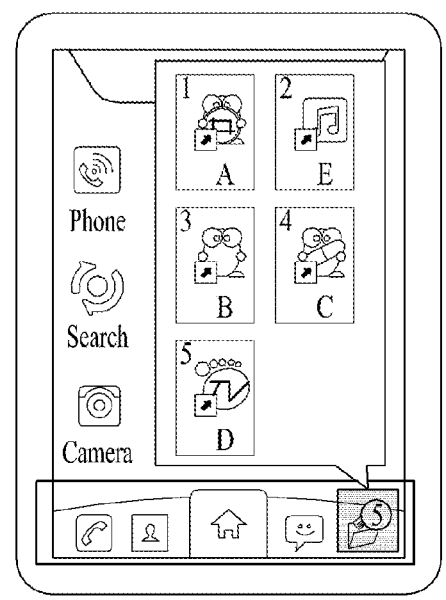
(b)

FIG. 10
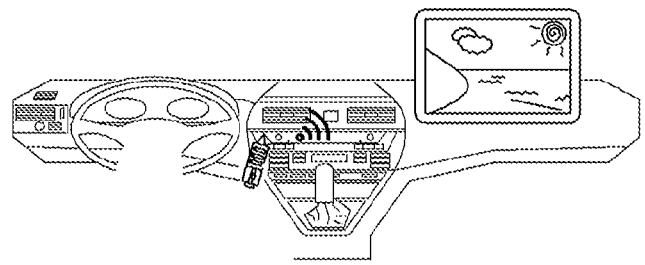
(a)
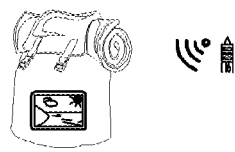
(b)
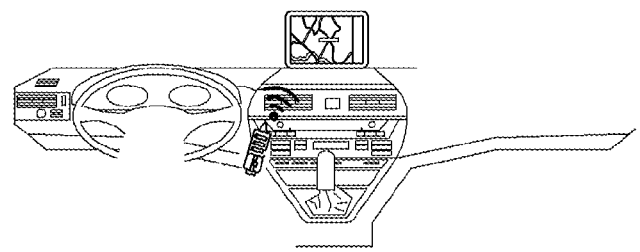
(c)

FIG. 11
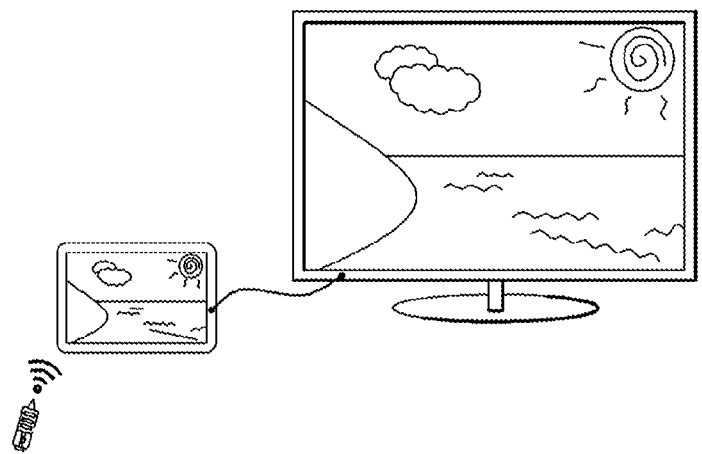
(a)
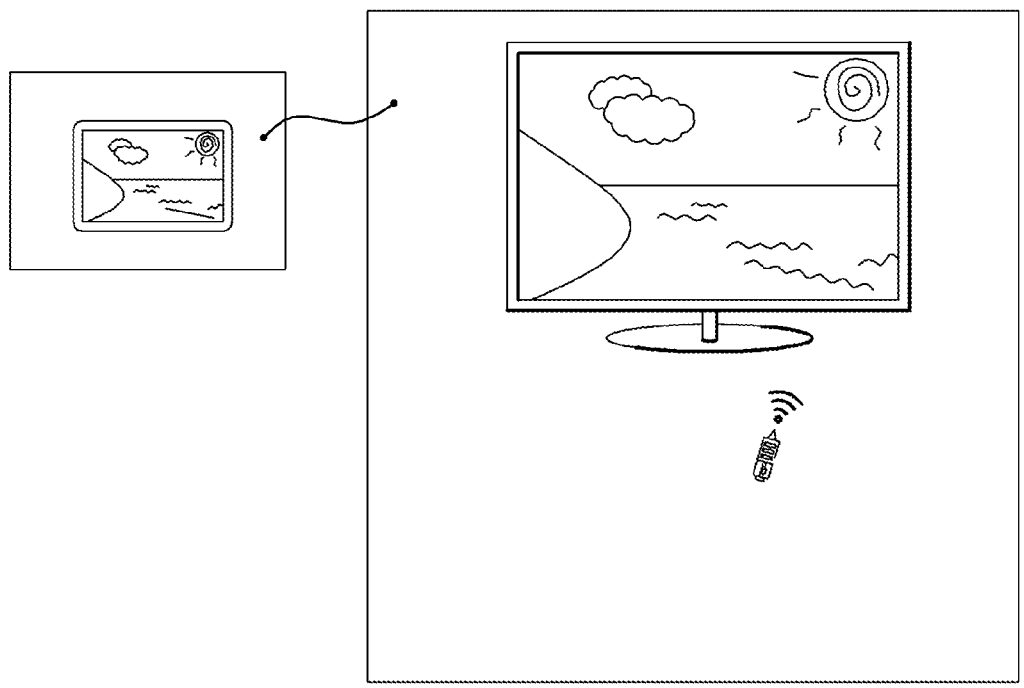
(b)

DIGITAL DEVICE AND METHOD FOR CONTROLLING THE SAME

Pursuant to 35 U.S.C. §119(a), this application claims the benefit of the Korean Patent Application No. 10-2012-0070941, filed on Jun. 29, 2012, which is hereby incorporated by reference as if fully set forth herein.

BACKGROUND OF THE INVENTION

Field of the Invention

The present invention relates to a method for controlling a digital device and, more particularly, to a digital device and a method for controlling the same without having to touch a digital screen of the digital device or without having to directly handle a control button, a control key, and so on, which are provided in the digital device.

Discussion of the Related Art

Recently, smart device, such as smart phones, tablet personal computers (PCs), and so on, have been extensively provided to consumers.

Smart devices provide convenience to the users, such as enabling the user to use the smart devices even in a mobile state without any limitation in space. However, such unlimited usage may distract the users' attention, thereby causing accidents in worst cases. Moreover, in order to use the smart devices, the users are required to handle the device directly.

Meanwhile, in the related art digital devices, simple functions, such as listening to music, selecting songs, and making phone calls, could be executed without requiring the user to directly handle the smart device.

Nevertheless, when using the related art smart device, the user is inevitably required to undergo some inconvenience in order to execute the diverse functions of his (or her) smart device.

SUMMARY OF THE INVENTION

Accordingly, the present invention is directed to a digital device and a method for controlling the same that substantially obviate one or more problems due to limitations and disadvantages of the related art.

An object of the present invention is to provide a digital device and a method for controlling the same that can enable the user to control the digital device even when its display is turned off.

Another object of the present invention is to provide a digital device and a method for controlling the same that can indirectly control the digital device with or without using a controlling medium.

A further object of the present invention is to provide a digital device and a method for controlling the same that can define and provide a virtual page so as to enhance the convenience in controlling the digital device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a digital device having its display turned off includes the steps of configuring a virtual page, wherein the virtual page includes at least one or more unique functions and applications of the digital device, receiving a user input, and outputting the configured virtual page and executing a predetermined function.

According to another aspect of the present invention, a digital device having its display turned off may include a user input receiver receiving a user input, a controller performing control operations, so as to configure a virtual page, wherein the virtual page includes at least one or more unique functions and applications of the digital device, and to execute a predetermined function in accordance with a user selection, and an output unit outputting the configured virtual page and outputting data respective to the execution of the predetermined function.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates an exemplary design concept of a smart key according to an embodiment of the present invention;

FIG. 5 illustrates another exemplary procedure for controlling the digital device according to the present invention;

FIG. 6 illustrates yet another exemplary procedure for controlling the digital device according to the present invention;

FIG. 7 to FIG. 9 illustrate exemplary virtual pages according to the present invention;

FIG. 10 and FIG. 11 illustrate exemplary usage scenarios to which the present invention may be applied.

DETAILED DESCRIPTION OF THE INVENTION

Figure 2:
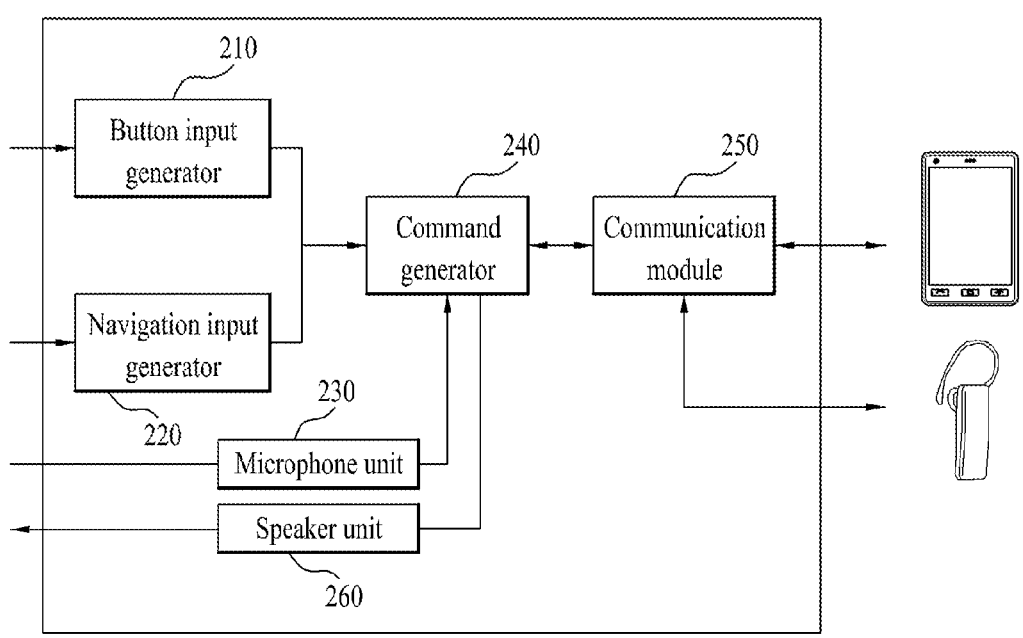
FIG. 2 illustrates a block view showing an exemplary structure of the smart key shown in FIG. 1.

Reference will now be made in detail to the preferred embodiments of the present invention, examples of which are illustrated in the accompanying drawings. Wherever possible, the same reference numbers will be used throughout the drawings to refer to the same or like parts.

The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention.

Reference will now be made in detail to the preferred embodiments of the present invention, examples of which are illustrated in the accompanying drawings. However, the embodiment of the present invention described below may be modified to a wide range of modifications. And, therefore, it should be understood that the present invention will not be limited only to the example presented in the description of the present invention set forth herein.

Although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood not simply by the actual terms used but by the meaning of each term lying within.

Hereinafter, the digital device and the method for controlling the same according to the embodiment(s) of the present invention will hereinafter be described in detail with reference to the accompanying drawings.

The method for controlling the digital device according to the present invention may be broadly divided into a case when a display of the digital device is turned off and a case when the display of the digital device is turned on, and detailed description of the same will be given accordingly. Herein, in some cases, the display may refer only to a backlight unit, or the display may collectively refer to both the backlight unit and a touch-screen panel.

As described above, the control of the digital device having its display turned off may be performed by maintaining the backlight unit in a power off state and by turning only the touch-screen panel on. Alternatively, the control of the digital device having its display turned off may be performed by using a medium, thereby allowing both the backlight unit and the touch-screen panel to be turned off. Meanwhile, both of the above-described cases may be used for the purpose of minimizing power consumption.

Additionally, the control of the digital device having its display turned on may be performed by using the medium or by not using any medium.

Moreover, a virtual page according to the present invention may be used in each of the above-described cases for controlling the digital device.

Meanwhile, in the following description of the present invention, the term "digital device" collectively refers to a device capable of communicating with another device via wired/wireless communication and providing a predetermined service. Examples of such digital device may include standing devices, such as television receivers (TV receivers), personal computers (PCs), as well as mobile devices, such as mobile phones, smart phones, tablet PCs, laptop (or notebook) computers, and so on. Meanwhile, the digital device may be provided with an operating system (OS), applications or software required for performing predetermined functions or for establishing communication, link, and so on, with other devices, firmware, and so on. Herein, the digital device may also download and use such OS, applications or software, firmware, and so on.

Additionally, in the description of the present invention, the term "medium" collectively refers to all means used for controlling the above-described digital device. Examples of such medium may include all types of devices that can transmit/receive (or transceive) and/or output a control command and the related data to a Bluetooth™ device, which is interconnected with the digital device, and to the digital device itself. Meanwhile, in the description of the present invention, such medium will be referred to as a smart key and will be described accordingly. Herein, the smart key may be used for general purposes or for solely controlling a specific digital device. Meanwhile, a digital device (e.g., smart phone) other than the digital device (e.g., TV or tablet PC), which corresponds to the control target of the medium, may also be used as the medium. Furthermore, whenever required, the medium may also be provided with firmware, software, applications, hardware, and so on.

Meanwhile, as described above, the medium may also correspond to a digital device. However, in the following description of the present invention, in order to avoid confusion and to simplify the distinction between the medium and the digital device being controlled by the medium, the digital device and the medium according to the present invention will be distinctively referred to as 'a digital device and a medium' or 'a main device (or first device) and a sub device (or second device)'. Furthermore, the term 'direct (or directly)' may refer to when the user physically touches or performs other actions on the digital device. And, the term 'indirect (or indirectly)' may refer to when the user controls the digital device by using other means, such as the medium, and so on, instead of directly controlling the digital device.

FIG. 1 illustrates an exemplary design concept of a smart key according to an embodiment of the present invention.

As an exemplary design concept of a smart key according to an embodiment of the present invention, FIG. 1 is divided into FIG. 1(a), FIG. 1(b), and FIG. 1(c). Herein, FIG. 1(a) illustrates a front part of the smart key, FIG. 1(b) illustrates a rear part of the smart key, and FIG. 1(c) illustrates each element configuring the front part of the smart key shown in FIG. 1(a).

The smart key will be divided into three main parts for simplicity. Herein, a first part 110 may correspond to a power unit, a second part 120 may correspond to a navigation unit, and a third part 130 may correspond to a button selection unit/touch unit.

The second part 120 may include a navigator 160 in order to perform navigating functions. And, the third part 130 may include a body part 180 and a touch pen 190. As shown in FIG. 1(a), function buttons, such as Stop, Command, Extra Command, and so on, may be provided on a front surface of the body part 180. And, as shown in FIG. 1(b), at least any one of a speaker 140 and a microphone 150 may be provided on a rear surface of the body part 180. Meanwhile, a display window may be provided on the front surface of the body part 180, and the display window may be provided along with the function button(s) mentioned above, or the display window may be provided instead of the function button(s) mentioned above. In case of the latter structure, controllable function buttons may be provided in touch mode through the display window.

The navigator 160 is configured to perform navigation in diverse directions, such as performing vertical, horizontal, circular movements. For example, the user may perform Move, Select, Execute functions on an item, application, page, current cursor, and so on, which are provided in the paired digital device by using the navigator 160.

The function button(s) may be configured to execute each of the diverse functions, such as Select, Execute, Stop, Volume Control, and so on, on the item, application, page, and so on, which are provided in the paired digital device.

Meanwhile, the function button(s) and the navigator 160 are correlated with one another and may, therefore, be used for selecting and executing functions. For example, among the function buttons, the control volume function may be activated by using the Extra Command button, and the detailed control of the activated volume control functions may be executed through the navigator 160. Additionally, when playing (or reproducing) a video (or moving picture image), after starting the playback function through the respective function button, diverse functions, such as playback speed, jump, stop, and so on, may be controlled through the navigator 160. And, as described above, the volume of the video that is currently being played may also be controlled at the same time.

Moreover, the touch pen 190 may be used during a process of selecting or inputting a predetermined text (or content) on the touch screen of the paired digital device. And, in order to prevent any damage on the touch pen, the touch pen 190 may be configured to be exposed only when in use and to be hidden within the body part in other cases, thereby increasing durability of the touch pen 190.

Described above is the design concept and elements of the smart key according to the embodiment of the present invention. However, the description presented above is merely an exemplary description, which is provided to facilitate the understanding of the present invention. And, therefore, it will be apparent that the present invention will not be limited only to the design or functional elements described above.

Meanwhile, a digital device having its display turned off according to the present invention may include a user input receiver, a controller, and an output unit. Herein, the user input receiver is configured to receive a user input. And, the controller is configured to configure a virtual page including at least one of unique functions and applications within the digital device, to control the digital device so as to output the virtual page, and to control the digital device so as to execute a predetermined function in accordance with the user's selection. And, the output unit is configured to output the virtual page and to output data respective to the execution of the predetermined function.

As described above, the controller may configure the virtual page, which is configured of one or more pages each consisting of at least one of text, image, and audio data. Herein, the virtual page may be configured to include link information, so that the virtual page can be linked to the corresponding function or application within the digital device, thereby executing the corresponding function or application. Accordingly, the controller may control the digital device so that the virtual page can be displayed on the digital device. Herein, the controller may perform control operations so that a backlight unit of the digital device can be turned off and that only the touch screen can be turned on. Additionally, the controller may control the digital device so that the virtual page can be delivered to the medium in the form of at least any one of text, audio, video, and image. And, the controller may also control the digital device so that a user interface (UI) for unlocking the digital device (or releasing the locked mode of the digital device) can be provided depending upon the received user input. Then, the controller may compare the unlock (or lock release) information being inputted by the user with the unlock information of the user, which is pre-stored in the digital device, so as to decide whether or not to perform the unlocking of the digital device. Moreover, the controller may set up a different authority level for each of the unique functions and applications. And, herein, the authority level may include at least one of Reading and/or Writing Allowed, Deletion Allowed/Not Allowed, Relocation (or Moving) Allowed/Not Allowed, and Hiding Allowed/Not Allowed.

As described above, the user input receiver may receive a user input by a touch motion performed on the digital device and/or through a medium. Herein, the medium may correspond to any one of a Bluetooth™ device, a smart device, and another digital device that can be connected through a network, so as to be paired with the corresponding digital device.

As described above, the user interface (UI), which is provided for the unlocking (or lock release) of the digital device, may be provided as a black screen in a state of having a backlight unit of the digital device turned off and having only a touchscreen panel turned on. Herein, unlock (or lock release) information of the user may correspond to at least one of a signature, a specific pattern, a specific alignment of fragments, and unique information or drawing of the user.

FIG. 2 illustrates a block view showing an exemplary structure of the smart key shown in FIG. 1.

Referring to FIG. 2, a smart key 200 may include a button input generator 210, a navigation input generator 220, a microphone unit 230, a command generator 240, a communication module 250, and a speaker unit 260.

Hereinafter, each element configuring the smart key 200 will be described in detail.

The button input generator 210 identifies a button input event of the smart key 200 and delivers the identified event information to the command generator 240.

The navigation input generator 220 identifies a navigation input event of the smart key 200 and delivers the identified event information to the command generator 240.

The microphone unit 230 regenerates sound/audio being inputted through a microphone of the smart key 200 by processing an Analog to Digital Converting (ADC) procedure. Then, the microphone unit 230 delivers the sound/audio to the command generator 240. Herein, the sound/audio may be delivered to the command generator 240 after passing through the microphone unit 230 and being regenerated, or the sound/audio may be directly delivered to the command generator 240 without any additional processing.

The command generator 240 may identify an event through the event information and the regenerated sound/audio, which are inputted from each element, or the command generator 240 may generate a command signal respective to the identified event. Accordingly, the generated command signal may be delivered to an external device through the communication module 250. Meanwhile, the command generator 240 may generate or may be provided with an interface, which is required for performing two-way (or bi-directional) communication with the communication module 250.

The communication module 250 may transmit a command signal, which is delivered from the command generator 240, to an external device, or the communication module 250 may receive a command signal, which is delivered from an external device, and may then deliver the received command signal to the command generator 240. Examples of such communication module 250 may include all types of modules that can perform wired/wireless communication, such as Bluetooth™ modules, transceivers, ZigBee communication modules, RS communication modules, and so on.

Meanwhile, the speaker unit 260 receives an event respective to sound/audio, which is inputted from the external device, from the command generator 240. Then, the speaker unit 260 regenerates the received event as an output signal by performing a Digital to Analog Converting (DAC) procedure on the received event. Thereafter, the speaker unit 260 outputs the regenerated output signal.

The external device may correspond to the above-described digital device or may correspond to another medium.

Furthermore, the command generator 240 and/or the communication module 250 may support a pairing protocol for pairing the smart key 200 with the external device. And, when required, in order to support the pairing protocol, the elements may be provided in advance with firmware, software, hardware, applications, and so on, or such firmware, software, hardware, applications, and so on, may be downloaded and used as required.

Figure 3:
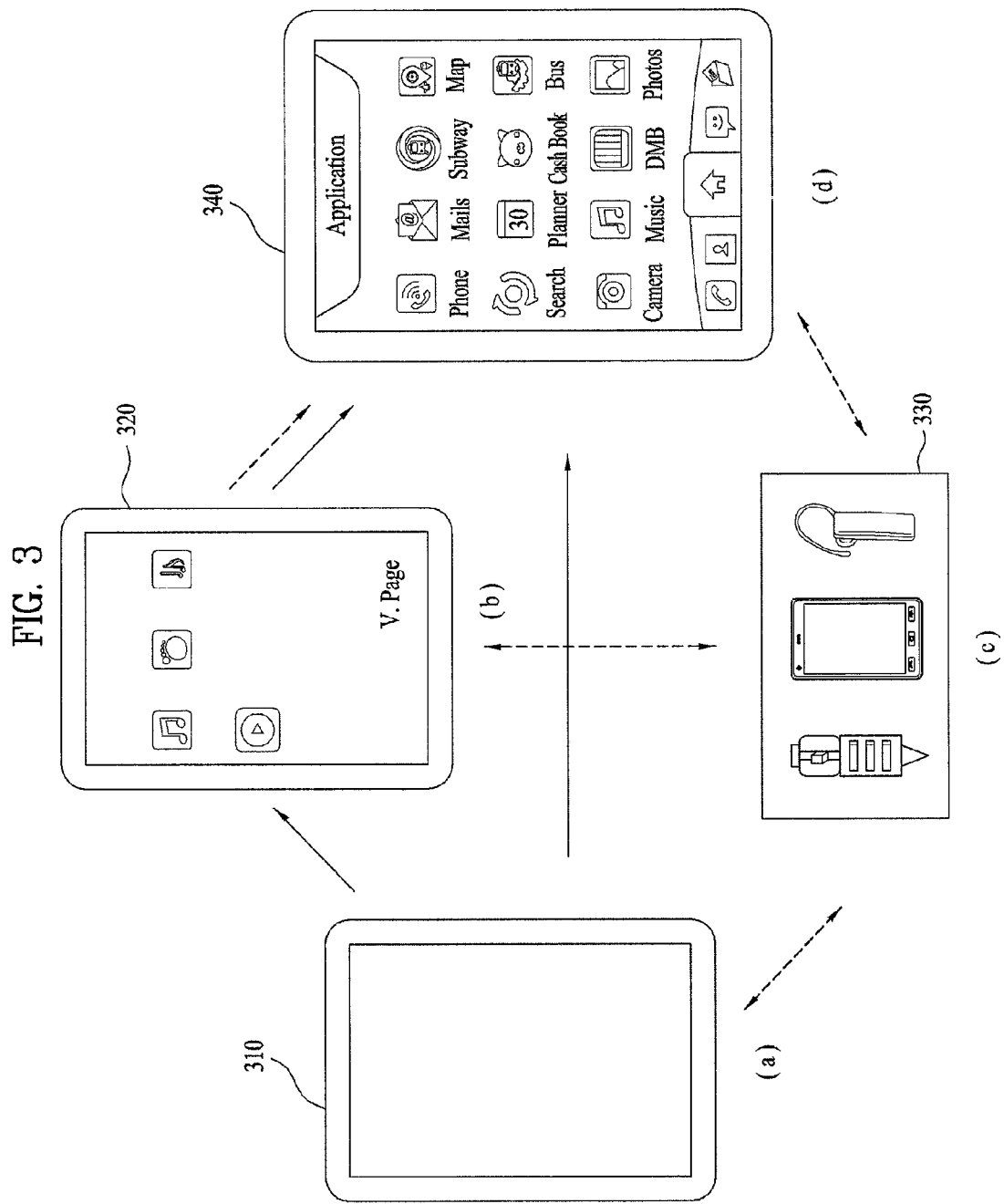
FIG. 3 illustrates a control flow between multiple digital devices according to the present invention.

FIG. 3 illustrates a control flow between multiple digital devices according to the present invention.

The control of the digital device according to the present invention may be realized by a control method directly performed by the user and/or by an indirect control method performed by using a control medium.

Meanwhile, the present invention seeks to enable the user to control his (or her) digital device more conveniently and more stably in diverse control situations and purposes, such as minimizing the consumed amount of power when little amount of power remains in the battery of the digital device, preventing the password of the user from being exposed, preventing any dangerous accidents from occurring due to the user's control of the digital device while driving a mobile vehicle.

Additionally, as described above, when controlling the digital device according to the present invention, a virtual page may be actively used. Meanwhile, the digital device may provide a virtual page for the purpose of controlling the digital device in a state of having the backlight turned off and the touch-screen panel turned on or in a state of having both the backlight and the touch-screen panel turned off.

Referring to FIG. 3, in describing the method for controlling the digital device according to the present invention, it will be assumed, as shown in FIG. 3(*a*), that the power of the display of the digital device 310 is turned off.

Herein, FIG. 3(*b*) illustrates a digital device 320 including a virtual page. FIG. 3(*c*) illustrates a medium 330. And, FIG. 3(*d*) illustrates a digital device 340 for indicating that the digital device, which is in the state of FIG. 3(*a*), is being controlled by passing through FIG. 3(*b*) and/or FIG. 3(*c*).

For example, in FIG. 3, each arrow is illustrated to indicate the control flow of the digital device. Meanwhile, the bold arrow is used to indicate the control flow of the digital device in a case when the medium is not being used. And, dotted arrow is used to indicate the control flow of the digital device in a case when the medium 330 is being used.

Referring to the former case, i.e., the case when the medium is not being used in order to control the digital device, when the display of the digital device is turned off, as shown in FIG. 3(*a*), when the user touches the digital device, a virtual page is provided on the display, as shown in FIG. 3(*b*). And, by using the displayed virtual page, the digital device may be controlled, as shown in FIG. 3(*d*). Meanwhile, when the digital device is directly controlled from the state shown in FIG. 3(*a*) to the state shown in FIG. 3(*d*), the digital device may be controlled by using a general control method. And, therefore, a detailed description of the same will be omitted for simplicity.

Meanwhile, referring to the latter case, i.e., the case when the medium is being used in order to control the digital device, when the display of the digital device is turned off as shown in FIG. 3(*a*), the user may control the digital device, as shown in FIG. 3(*d*), by using the medium shown in FIG. 3(*c*). And, even when the user uses the medium shown in FIG. 3(*c*), when the virtual page is provided as shown in FIG. 3(*b*), the user may select/control the virtual page through the medium 330, thereby being capable of controlling the digital device, as shown in FIG. 3(*d*).

Meanwhile, as described above, the virtual page may be configured to include diverse types of application, software, firmware, audio/video/image data (hereinafter, collectively referred to as 'application', yet all content included in the digital device may configure the virtual page), which are provided in the digital device 340.

Herein, the virtual page may be configured to include all of the applications mentioned above. Alternatively, however, the virtual page may also be configured to include only a predetermined number of applications based upon at least one type of information, such as the most recently used applications, the most frequently used applications, applications having the highest priority levels, predetermined applications, applications related to the unique basic functions of the corresponding digital device, or applications related to the unique attributes of the corresponding device.

Meanwhile, examples of the medium 330 shown in FIG. 3(*c*) may include smart devices, such as a smart key, as shown in FIG. 1, a Bluetooth™ device, a smart phone, a tablet PC, and so on.

The overall control flow between multiple digital devices is described above with reference to FIG. 3. However, as described above, the basic control process is identical to the example shown in FIG. 3. However, although it is not shown in the drawing, when required, some additional devices or control flows may be further included or may be removed.

Figure 4:
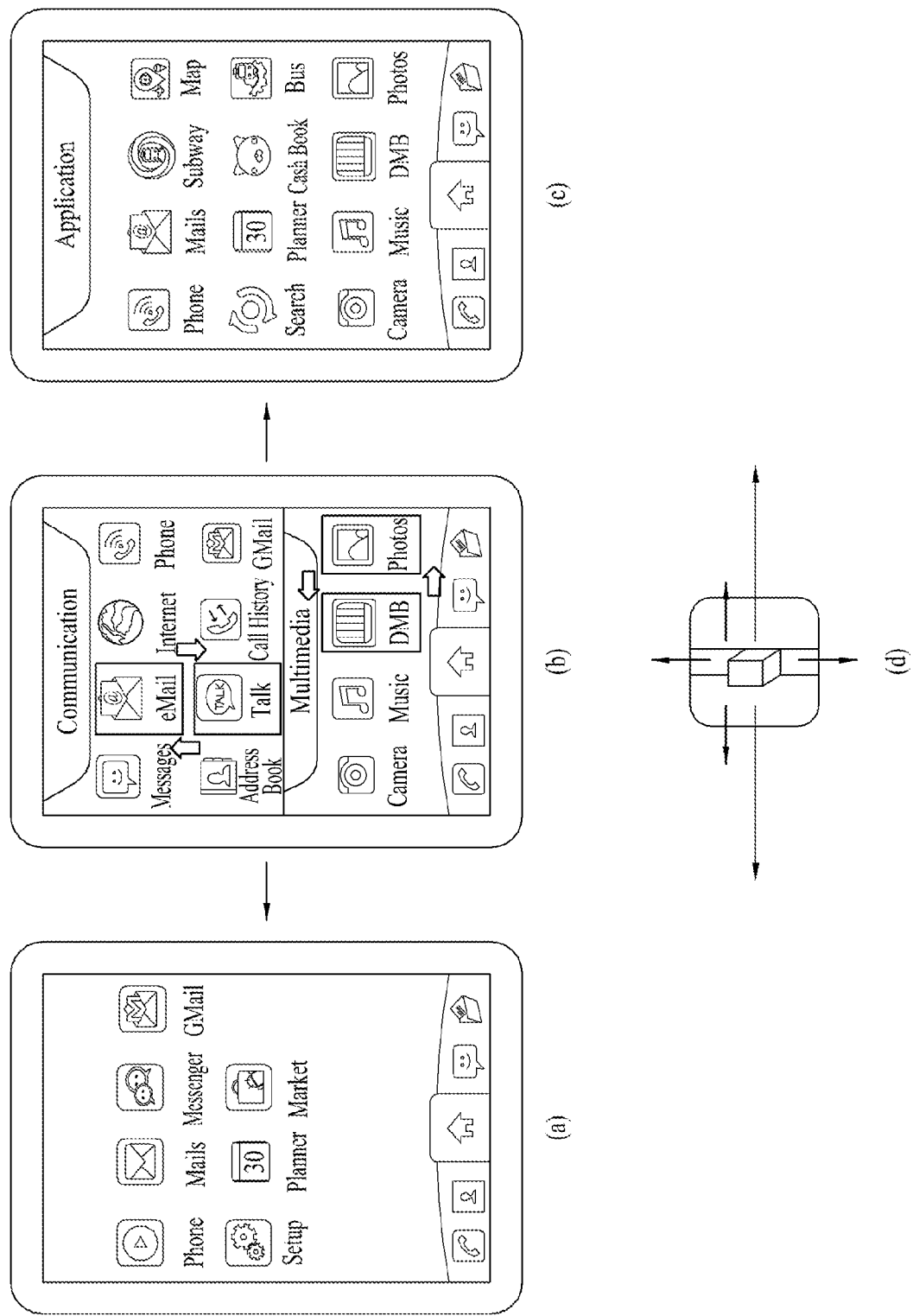
FIG. 4 illustrates an exemplary procedure for controlling the digital device according to the present invention.

FIG. 4 illustrates an exemplary procedure for controlling the digital device according to the present invention.

More specifically, FIG. 4(*a*) illustrates a previous page, FIG. 4(*b*) illustrates a current page, and FIG. 4(*c*) illustrates a next page.

The procedures shown in FIG. 4(*a*) to FIG. 4(*c*) may, for example, be performed by using the navigator of the smart key shown in FIG. 1 and FIG. 4(*d*).

The method of performing navigation by using the navigator of will hereinafter be described in detail. Hereinafter, the following operations of the navigator will be defined and described only for the purpose of simplifying the description of the present invention. And, therefore, the present invention will not be limited only to the example described below.

In order to perform the Turn Page function of the digital device, i.e., in order to turn the page displayed on the digital device, the user may make a long and continued pushing (or sliding) motion with a direction stick provided on the navigator along leftward/rightward directions (or horizontal directions), so as to turn to a wanted page. For example, in a state when the current page is displayed, as shown in FIG. 4(*b*), when the user makes a long pushing (or sliding) motion leftwards with the direction stick, the user may turn to the previous page, as shown in FIG. 4(*a*). Alternatively, when the user makes a long pushing (or sliding) motion rightwards with the direction stick, the user may turn to the next page, as shown in FIG. 4(*c*). In the description presented above, the adjective 'long' may be defined based upon an angle of the pushing motion or based upon a duration time of the pushing motion. For example, when the long pushing motion is defined based upon the angle of the pushing motion, the angle may correspond to 45 degrees (45°) or more. Alternatively, when the long pushing motion is defined based upon the duration time of the pushing motion, the duration time may correspond to 2 seconds (2 sec.) or more.

Subsequently, when navigating through items (or options), as shown in FIG. 4(*b*), the user may push the direction stick along horizontal and/or vertical directions, so as to move a cursor within the corresponding page along the respective directions, thereby performing navigation. In order to be differentiated from the above-described motion of turning the pages, for example, when the pushing motion is performed with a duration time relatively shorter than that of the long pushing motion for turning pages, the navigator may identify the relatively shorter pushing motion of the direction stick as the Navigate Items function.

Referring to FIG. 4(b), among the multiple applications that are listed up on the display of the digital device, the user may navigate between the E-mail application and the Talk application by moving the direction stick along vertical directions (or up-and-down directions). Alternatively, the user may also navigate between the Music application and the Camera application by moving the direction stick along horizontal directions (or left-and-right directions).

Meanwhile, as shown in FIG. 4(b), after navigating through application, the user may manipulate the direction stick, so as to select and execute a specific application. For example, by making long continued pushing motions on the direction stick along the vertical direction (or up-and-down directions) instead of the horizontal direction (or left-and-right directions), as described above, the user may execute the Select and Execute functions. In other words, when the user makes a long continued downward pushing motion on the direction stick, the user may select and execute the corresponding application. And, when the user makes a long continued upward pushing motion on the direction stick, the user may select and execute the corresponding application. And, when the user makes a long continued downward pushing motion on the direction stick, the user may stop or cancel the selection and execution of the corresponding application. Alternatively, the above-described Select, Execute, Stop Execution functions performed on the respective application may be defined by pushing the direction stick for a predetermined period of time or by manipulating the power button.

Furthermore, in correlation with a predetermined button shown in FIG. 1, the above-described method may also be defined to have another meaning. For example, when a Volume command button is executed during the process of executing functions, as shown in FIG. 4(a) to FIG. 4(c), subsequent up-and-down controls and left-and-right controls of the direction stick may be recognized as volume control functions.

FIG. 5 illustrates another exemplary procedure for controlling the digital device according to the present invention.

A more detailed description of the present invention will be provided with reference to FIG. 5 on the control operations performed during the process of selecting and executing the corresponding application as operations performed after the application navigation process, which is performed as shown in FIG. 4.

As shown in FIG. 5(a), the user may locate the current cursor over the Talk application by using the direction stick. At this point, when the user presses on the power button, the corresponding Talk application is selected and executed. Thereafter, the display screen of the digital device is shifted from FIG. 5(a) to FIG. 5(b).

Subsequently, as shown in FIG. 5(b), if the user wishes to stop the execution of the application that is currently being executed, the user may press on the power button once again, or the user may press on a corresponding button among the multiple control buttons provided on the smart key, thereby stopping the execution of the current application. Accordingly, the display screen of the display device may return from the page shown in FIG. 5(b) to the previous current page prior to selecting and executing the corresponding application, i.e., the display screen may return to the page shown in FIG. 5(a).

Meanwhile, when executing an application, as shown in FIG. 5(b), for example, when additional input of text is required, such as in a log-in or sign-in procedure, a virtual page (virtual key board) or a microphone of the smart key may be used. For example, when a virtual keyboard is provided through the virtual page, the user may input the wanted (or required) data by moving the direction stick along horizontal and vertical directions. In this case, when displayed for the first time, the user is notified that the virtual page, i.e., the virtual keyboard, has been provided through the speaker of the smart key. Then, by providing a predetermined note (or tone) through the speaker each time the user moves the direction stick along the horizontal and vertical directions, the smart key may allow the user to recognize the current position of the cursor, so as to guide the user to reach the wanted note (or tone), i.e., position. Alternatively, when the user pushes the direction stick rightwards, a series of tones (or notes) may be provided in an increasing alphabetical order of "abcde . . . z". And, when the user pushes the direction stick leftwards, a series of tones (or notes) may be provided in a decreasing alphabetical order of "zyxwv . . . ba". Thus, the user may be capable of conveniently selecting the wanted tone (or note). Furthermore, as described above, when a tone is inputted through the microphone, the corresponding tone may be selected from and inputted to the digital device via voice recognition.

FIG. 6 illustrates yet another exemplary procedure for controlling the digital device according to the present invention.

FIG. 6 shows another exemplary method of performing navigation, which is similar to the method shown in FIG. 4.

For example, as opposed to the example shown in FIG. 4, wherein the user is required to decide on a selected item after visually verifying which item is being accessed, during the control process performed by using the direction stick, the exemplary method shown in FIG. 6 corresponds to a case when it is difficult for the user to visually verify the current access of a specific item, due to the digital device of the user being located inside a backpack of the user. Accordingly, the user may be capable of recognizing the item that is currently being accessed based upon sound/audio information, which is provided through the speaker provided on the rear part of the smart device.

Accordingly, when the user positions the initial cursor over the Search Location application, sound/audio information notifying the user that "Your cursor is on Search Location" may be provided through the speaker. Thereafter, when the user continues to adjust the location of the cursor by using the direction stick, sound/audio information respective to each of the corresponding item may be provided through the speaker, such as "Your cursor is on Map", and so on.

Afterwards, when the cursor is finally located on the application wanted by the user, as described above, the user may use (or manipulate) the power button so as to execute the corresponding application. In this case, sound/audio information notifying the user that the corresponding application is about to be executed, e.g., "XXX application will be starting now", is outputted through the speaker.

Furthermore, during the execution process of the selected application, even when the user is required to input a particular input, respective sound/audio information is continuously provided through the speaker, so that the corresponding application can be executed without any problems or difficulty.

For example, when the item on which the cursor is located corresponds to a folder, in which multiple applications are included, if the cursor remains over the corresponding folder for a predetermined period of time, a list of the applications located in the corresponding folder may be provided through the speaker as sound/audio information.

Figure 7:
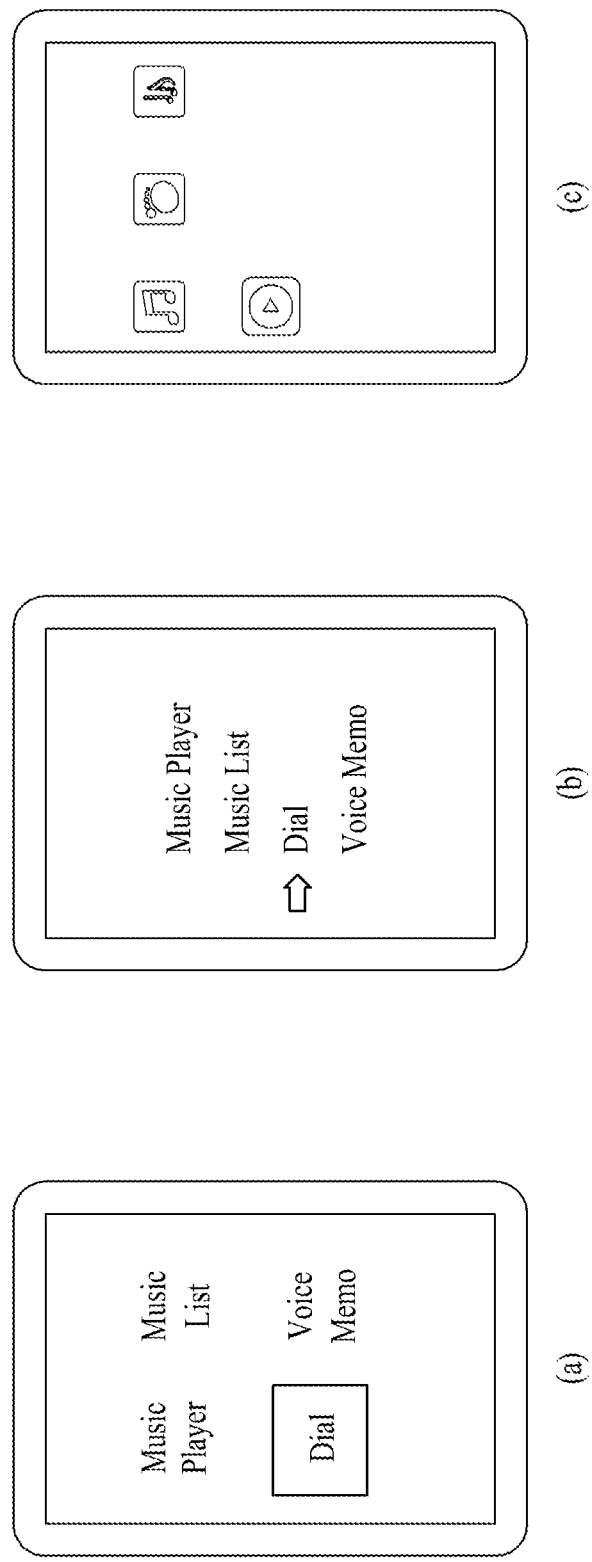
Figure 8:
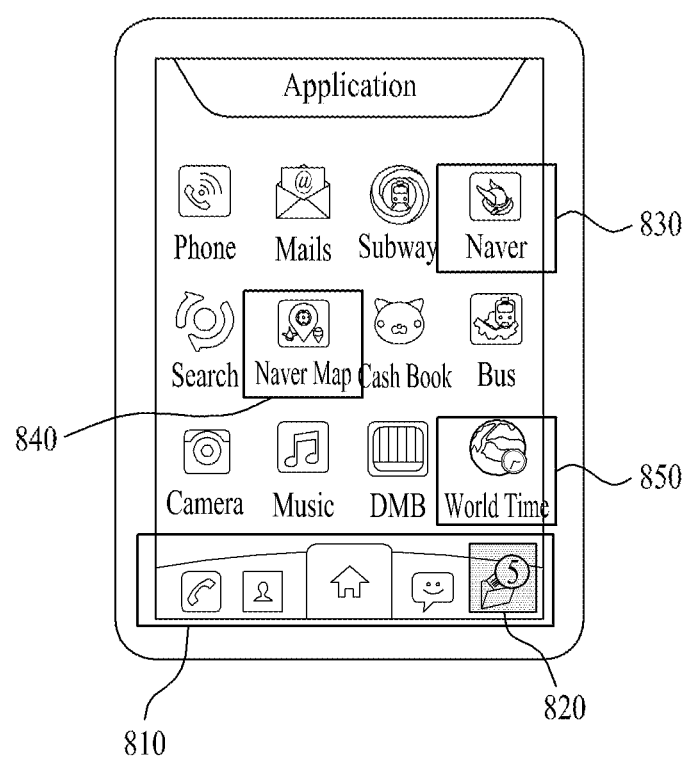

FIG. 7 to FIG. 9 illustrate exemplary virtual pages according to the present invention.

More specifically, FIG. 7 to FIG. 9 illustrate virtual page configurations according to diverse embodiments of the present invention. And, therefore, the present invention will not be limited only to the examples set forth herein.

A virtual page does not correspond to an actual page, such as a list of applications aligned and provided on the display of the digital device. Nevertheless, the virtual page may be configured to virtually help the user perform diverse selection on the digital device, or to help the user select and perform a function or application. Such virtual page is generally provided in the form of voice. However, the present invention will not be limited only to this. For example, as described above with reference to FIG. 4, the virtual page may be provided by turning on only the backlight or the touch-screen panel. Meanwhile, the method of turning on only the backlight or the touch-screen panel in order to provide the virtual page may be performed in accordance with automatic or manual settings. In case the virtual page is provided in accordance with automatic settings, when the remaining amount of power in the battery of the corresponding digital device is below a predetermined level, the virtual page may be provided by default.

Such virtual page may be configured in the digital device and may be provided therefrom. Herein, the virtual page may be configured of icons, text, and so on, as shown in FIG. 7(*a*) to FIG. 7(*c*).

Referring to FIG. 7(*a*), when a button event occurs in the smart key, the virtual page may be loaded on the display screen. Additionally, when a smart key exists, the virtual page may also be loaded on the display screen when the Extra Command button is inputted in accordance with a specific pattern.

As described above, when the virtual page is being loaded on the virtual page, in order to minimize amount of power consumption in the digital device, white text or icons may be generated and provided on a black background.

Meanwhile, as described above, the generated icon or text may correspond to an application being registered in advance in a Virtual Page Configuration File. And, when a smart key is not provided, the loading of the virtual page may be performed by pressing on a command button, such as the volume control button, for a predetermined period of time.

Meanwhile, with respect to a User Control Panel according to the present invention, the user may choose whether or not to use the virtual page, or the user may choose whether or not to output the virtual page when using the virtual page, from a User Settings menu of the smart device. Moreover, although the virtual page may be activated as described above, the function of outputting the Black-White screen may not be used.

Additionally, a key input pattern for loading the virtual page according to the present invention may cause a false operation, for example, when the virtual page usage mode is turned on, and when the digital device is carried in the user's packet. Therefore, when the virtual page is to be outputted in the form of the Black-While screen, the user shall be required to input a predetermined specific pattern. For example, in case of using the smart key, the virtual page may be outputted when the user manipulates the navigator downwards and presses on a command button, which is located on the upper portion of the smart key.

FIG. 8 illustrates an exemplary method of having the user configure the virtual page.

A list of diverse applications is shown in the display of the digital device. At this point, in the corresponding digital device, items that are used to perform the basic functions of the digital device or items that are most frequently used are provided in the last (or bottom) line 810.

With respect to the present invention, the last line 810 may include a virtual page folder 820 along with many other items, such as Phone, Address Book, Messages, Mail, Home, and so on. The items belonging to the last line 810 may be deleted, added, relocated, and so on, based upon the user's selection. Accordingly, the display of the virtual page folder 820 according to the present invention in the last line 810 is not mandatory, and, therefore, the virtual page folder 820 may also exist in the main screen.

Meanwhile, the virtual page folder 820 may indicate a number of applications or items, which are included in the folder in order to configure the virtual page, on the corresponding icon. Referring to FIG. 8, the user may immediately recognize that 5 applications are included in the virtual page folder 820.

Additionally, when the user selects the virtual page folder, the selected virtual page folder may provide a display of the applications belonging to the corresponding folder on the main screen. At this point, in order to prevent the user from experiencing any confusion, the applications of the virtual page folder 820 being provided on the main screen may be provided in the form of shortcut icons, as shown in FIG. 9, instead of the actual application icons. Therefore, even when a predetermined application item is deleted from or added to the virtual page folder 820, the original application item remains unchanged. Alternatively, as described above, when the user selects the virtual page folder 820, the applications belonging to the selected virtual page folder 820 may be highlighted and displayed on the main screen. Accordingly, as shown in FIG. 9(*a*) and FIG. 9(*b*), the user may be capable of recognizing the application items 830 to 850, which belong to the virtual page folder 820, without having to open and look into the provided virtual page folder 820. As described above, when the user locates the cursor on a predetermined application item, such as a World Time application 850, the digital device may provide a menu item allowing the user to select whether or not to exclude or delete the corresponding application item from the virtual page. Furthermore, in the above-described case, when the user locates the cursor on each application item for more than a predetermined period of time, or when the user performs a drag & drop motion on the corresponding application, the user may be capable of editing the application items configuring the virtual page within the virtual page folder.

As described above, FIG. 9(*a*) to FIG. 9(*b*) correspond to exemplary embodiments of providing application items that configure a virtual page, when the user has selected the virtual page folder 820. Referring to FIG. 9(*a*), the virtual page may be displayed instead of the main screen, or, referring to FIG. 9(*b*), the virtual page may be provided on the main screen in the form of a pop-up window. Additionally, other virtual page or virtual page folder configurations that have not been illustrated in the drawings or described herein may also be included as exemplary embodiments of the present invention. And, therefore, it will be apparent that the present invention will not be limited only to the examples given in the description of the present invention.

As described above, when the display of the digital device is turned off, or when the digital device is kept in the backpack of the user, the user may be provided with voice guidance through a Voice Sound System of the smart key. However, since the user is incapable of viewing the display screen, the process of scanning the entire page of the digital device may require a considerable amount of time, or may be inefficient, or may rather confuse the user. For such reasons, the concept of the virtual page has been proposed. Herein, for example, it is preferable that the virtual page is configured to include at least one or more pages. However, it will be preferable to limit the number of pages to a lower number. It will also be preferable to limit the number of application. Meanwhile, with respect to the number of applications, and with respect to the application configuration (or layout) of the virtual page, in the above-described example, when the user is incapable of viewing the display of the digital device, it may be more likely and more efficient to use audio-based application rather than image-based applications, through which images are outputted. And, therefore, it may be preferable to configure the application layout in the virtual page accordingly. Such virtual page may only be used temporarily within the digital device and may not be outputted to the display screen. Nevertheless, as shown in FIG. 3 or FIG. 7(c), the virtual page may be outputted to the display screen by only turning on the power of the touch-screen panel.

FIG. 10 and FIG. 11 illustrate exemplary usage scenarios to which the present invention may be applied.

FIG. 10 to FIG. 11 shows examples of using the smart key in real life.

When a user directly handles (or manipulates) his (or her) digital device while driving a motor vehicle, the user may put himself (or herself) in a very dangerous situation, such as car accidents. Therefore, it is preferable for the user to control his (or her) digital device indirectly.

In recently manufactured automobiles, separate control keys are generally provided on the steering wheel or a separate remote controller is generally provided in order allow the user to indirectly control his (or her) car audio system. However, such devices are merely supplementary components belonging to the vehicle itself. And, therefore, there are many limitations in the usage of such components, and such components are only capable of performing very simple functions.

However, regardless of such environment, when the user seeks to handle his (or her) smart phone or tablet PC while driving, the above-described function keys provided on the steering wheel or the above-described separate audio remote controller become useless. Eventually, the user is required to directly handle his (or her) device, thereby causing inconvenience to the user and distracting the user's attention, which is recognized as a critical factor. Additionally, it is even more dangerous and inconvenient when the digital device is placed beyond the user's reach. Evidently, some minor functions of the digital device may be controlled by using a Bluetooth™ device, which has recently been actively and extensively provided. However, such control functions are limited to only a few specific functions, and, therefore, the control functions of the Bluetooth device cannot fully and sufficiently control the digital device of the user as desired.

The digital device may be used as a navigation system or a video (or moving image) player, when used in a car. As shown in FIG. 10(a) to FIG. 10(c), the digital device is generally fixed to a right side of a center fascia of the car (i.e., facing into the front passenger seat) or to the middle of the center fascia. In this case, since most of the digital devices are controlled by using the touch method, the user may experience difficulty in controlling the digital device, such as turning to a different page or operating (or manipulating) applications, while driving. It is needless to say that such controlling of the digital device while driving is an extremely dangerous act that can cause minor to lethal car accidents. Therefore, by allowing the user to control his (or her) digital device using a smart key via wireless (or radio) communication means, the user's convenience and safety may be promoted. Additionally, by using such smart key, the user may be capable of showing a selected video or web page, and so on, to other passengers in the car.

Referring to FIG. 10(b), as the smart key can provide voice sound information, when the user keeps his (or her) digital device in a backpack or a cross bag, the user may manipulate and use the digital device through the voice guidance of the Voice Sound System. During this process, the above-described virtual page may be used. Additionally, even when the display of the digital device is turned off in order to save the power remaining in the battery, the voice sound system and the navigator may be used for operating a media playback application, so as to play a media file and to use other functions, such as recording and/or playing voice memos, making voiced phone calls, and so on.

Referring to FIG. 11(a) or FIG. 11(b), the digital device may be connected to a large screen display device, such as an LCD TV, so as to be used as an USB memory stick, a mini HDMI, a DLNA, and so on. In this case, without having to directly touch the digital device, the user may use the smart key to view the screen being outputted to the large screen display device, and the user may also control the digital device through a wireless communication means. For example, the user may be capable perform digital device functions, such as watching a movie or performing a web search, at a remote distance.

In addition, for example, as shown in FIG. 11(b), in a regular household, when a child of the user is watching a video stored in the user's smart phone through a large screen display device, while the user is in the kitchen, it would be inconvenience for the user to come out of the kitchen and into the room where the large screen display device is installed, in order to directly handle the display device each time a video is ended and a new video is required to be played.

Meanwhile, the smart key may also be used in systems, such as intelligent navigation systems, that use an operating system (OS), such as Android, iPhone, embedded Linux, Windows Mobile, and so on. Herein, diverse functions, such as Move Map, Setup Navigation Mode, Change Channel, Change Menu, Transmit and Receive Data, and so on, may also be controlled by the above-described smart key.

As described above, in the cases shown in FIG. 10(a) to FIG. 11(b), it will be difficult for the user to control the digital device by only using the related art control means. However, according to the present invention, the user may be capable of performing a control function similar to directly handling the digital device by using a new medium, or by using the conventional medium, so as to indirectly control the digital device. Thus, the user convenience may be enhanced, and the user satisfaction may be increased.

Meanwhile, when the user uses his (or her) digital device while traveling by public transportation, such as the subway, the bus, and so on, or when the user uses his (or her) digital device in an exposed environment, in addition to the On/Off mode of the display of the digital device, the user may also use the present invention for deciding whether or not to unlock (i.e., perform Lock Release) the digital device.

For example, when the digital device is in a state of having its backlight turned off, and when the power of the smart key, which is paired with the digital device, is turned on, only the touch-screen panel may be turned on, so as to wait (or be on stand-by) for the user's touch input.

At this point, the digital device provides a black screen, so as to recognize unlock (or lock release) information being inputted through the touch pen of the smart key. Then, the digital device compares the recognized unlock information with pre-stored unlock information. Subsequently, after determining whether or not user authorization has been made, the digital device may device whether or not to unlock (or release the lock mode) of the digital device. If the difference between the extracted user-inputted unlock information and the pre-stored user unlock information exceeds a predetermined reference value, a user interface (UI) may be provided, so that the user can re-input the unlock information. Meanwhile, when the unlock information is inputted to the black screen, the digital device may process the inputted information, so that no trace of the information remains, thereby preventing the unlock information from being exposed.

As described above, the unlock information may include diverse information, such as a signature, a specific pattern, a specific alignment of fragments, and unique information or drawing of the user. Additionally, the unlock information may sequentially request for the input of multiple unlock information in accordance with a predetermined security level.

Moreover, when the user presses on the power button or touches the locked digital device, instead of immediately providing a UI for unlocking the digital device, the main screen or a page (wherein all applications are automatically set up to be in a locked state) of the digital device is first provided. Thereafter, the UI for unlocking the digital device is provided be overlap with the main screen. Thus, exposure of the UI for unlocking the digital device to a third party may be prevented.

Meanwhile, the digital device is equipped with diverse unlock (or lock release) methods, such as the original unlock method, the above-described signature information inputting method, and so on. Then, after providing the respective UI, the unlock method may be shifted to the corresponding unlock method, which is selected by the user.

Additionally, according to the embodiment of the present invention, the digital device may also control each application separately. Most particularly, as described above, when the digital device according to the present invention is being controlled, such individual application control may be applied to the case when the digital device is unlocked or to all cases wherein the digital device is being used.

For example, among all of the provided applications, applications that are most frequently used by the user may be provided without being separately locked, so that the corresponding applications may be used as quickly as possible by the user. And, applications carrying important or private and personal information may be set to be locked, so as to protect and ensure the user's privacy.

Meanwhile, in the description of the present invention, authority may be set up along with each of the applications, or the authority may be set up separately, so as to be used when controlling the digital device.

For example, in case of an application through which personal information may be exposed, the authority to hide the corresponding application may be set up. Accordingly, the corresponding application may be accessed only by inputting separate unlock (or lock release) information with respect to specific user settings or to the input of a specific user action. Also, in order to resolve any problems that may be caused when the user accidentally deletes the corresponding application, or in order to resolve the inconvenience of having difficulty in finding the corresponding application, when the application has been moved to another location, the user is required to undergo a specific procedure of inputting additional information or inputting user verification, so as to be capable of deleting, moving (or relocating), and so on, the corresponding application.

Furthermore, in case of an application including personal memos or some work-related content, or in case of an application having a middle level of importance, the authority level may be set up, so that the corresponding application can be in a Read Only mode or in a Read/Write mode or Write mode.

As described above, in the description of the present invention, by setting up separate authority levels on each application or on some or all of the items included in a corresponding application, distinguished information or functions maybe provided in accordance with the user's input information. Respectively, the virtual page or virtual page folder described above in the present invention may be conveniently used by being separately set up to be in a Hide mode or to be in a Read & Write mode. Meanwhile, in case of folders, authority levels may be set up on the entire folder. And, in this case, all of the applications included in the corresponding folder may be influenced by the same authority level. Alternatively, additional authority level setup may also be separately made on any corresponding application included in the folder.

For example, it will be assumed that the user has attended an important meeting while leaving his (or her) digital device on his (or her) desk, and that all documents for the meeting are stored in the digital device of each member of the meeting. In this case, if the user asks another member to lend him (or her) his (or her) digital device, the password and other personal information stored in the digital device of the other member may be exposed.

However, even in such case, according to the present invention, the user may directly perform the unlocking (or lock release) easily, thereby preventing his (or her) unlock information, such as the password, from being exposed. And, in case the distance between the user and the digital device is within a predetermined range of proximity, the user may be capable of directly controlling his (or her) digital device by using a medium, so as to share the corresponding information stored in his (or her) digital device on a cloud server. The user may then download and use the required document. Therefore, even when the user borrows another person's digital device, only the corresponding content may be set to be accessed through a separate virtual page, or, even if the whole digital device becomes turned on, in accordance with the authority level settings, the exposure of other personal information in addition to the contents of the required document may be minimized.

Meanwhile, according to the present invention, multiple users may share and use one digital device. At this point, the medium may be used. For example, it will be assumed that one digital device is connected to another display device, and that the multiple users seek to use a game application provided in the corresponding digital device.

In this case, each user may connect his (or her) medium with the corresponding digital device after executing a pairing procedure between the medium of the user and the corresponding digital device and/or an authority request/approval procedure. Thereafter, the user may enjoy the game application with other users connected to the same digital device.

Additionally, multiple media may be searched and found within a predetermined network provided in a digital device. In this case, the digital device may receive predetermined information in order to be paired with and connected to a specific medium. Such connection process may be performed by having the user input predetermined information on the display of the digital device, or by having the user input audio information through the medium, so as to compare the inputted information with pre-stored information.

Moreover, the virtual page may also consist of multiple pages. And, in this case, each page may be individually set to have a different authority level and may then be used.

Meanwhile, a mobile device may perform control operations of reporting the current mobile device status to the user at each step, when the virtual page is being provided, and when the respective control functions are being executed. Then, by requesting for an authority level, the mobile device may perform control operations of executing the corresponding functions, only when the user has approved of the authority level request made by the mobile device.

For example, the above-described process may be used for preventing any harm, damage, or loss that may be caused due to any information exposure, which may occur when the user loses his (or her) mobile device or has his (or her) mobile device stolen, or due to an incorrect or improper usage of the mobile device.

Herein, the virtual page may be configured of diverse software, applications, and so on, which are mostly included in the mobile device. For example, the virtual page may automatically include the user's most recently and frequently used applications. Alternatively, the user may also manually configure the virtual page in advance.

When the user uses a medium, such virtual page may, for example, be modified to a data format, such as text, audio, and so on, so as to be converted to a format that can be recognized by the corresponding medium, thereby being provided to the user.

Meanwhile, when the user uses the medium, the digital device may provide feedback to the medium in diverse formats, such as vibration, image, audio, and so on, at each step, so as to notify the user that the interconnected operation and control are being performed between the two devices.

Meanwhile, when the mobile device provides a virtual page, the user may manipulate a predetermined button of the medium, as shown in FIG. 1, or may input a voice command, so as to control the mobile device. Additionally, even when the digital device remains locked, the above-described virtual page may be delivered to the medium in the form of audio, image, video, text, and so on. And, the virtual page may also be provided when the backlight of the digital device is turned off, and when only the touch-screen panel is turned on.

In the description presented above, applications have been given as examples in order to facilitate the description of the present invention. However, the present invention will not be limited only to the examples presented herein. And, therefore, any type of data within the digital device may be included and used.

An example of a method for controlling a digital device having its display turned off, the method according to the present invention may consist of a procedure of first configuring a virtual page, wherein the virtual page includes at least one or more unique functions and applications of the digital device, then receiving a user input, and finally, outputting the configured virtual page and executing a predetermined function.

As described above, the virtual page may consist of one or more pages each being configured of any one of text, image, and audio data, wherein the virtual page may include link information, so as to be linked to a corresponding function or application within the digital device in accordance with a user selection, thereby executing the corresponding function or application. As described above, the user input may be inputted by a touch motion performed on the digital device and/or through a medium being paired with the digital device.

As described above, the medium may correspond to any one of a Bluetooth™ device, a smart device, and another digital device, the medium being connected through a network so as to be paired with the digital device, and an output of the virtual page may outputted by having a backlight unit of the digital device turned off and by having only a touch-screen panel of the digital device turned on, thereby being outputted on the touch-screen panel. Additionally, an output of the virtual page may be outputted by being delivered to the medium in the form of at least one of text, audio, video, and image.

Meanwhile, in the above described method, a user interface (UI) configured to unlock the digital device may be provided in accordance with the received user input. Then, once unlock information of the user is received, the unlock information inputted by the user is compared with pre-stored unlock information of the user, so that whether or not to unlock the digital device can be decided. Herein, the UI being provided for unlocking the digital device may be provided as a black screen in a state when a backlight unit of the digital device is turned off and when only a touch-screen panel is turned on, and the unlock information of the user may correspond to at least one of a signature, a specific pattern, a specific alignment of fragments, and unique information or drawing of the user.

As described above, the digital device may set up different authority levels for each of the unique functions and applications, wherein the authority level may include at least one of at least one of Reading and/or Writing Allowed, Deletion Allowed/Not Allowed, Relocation (or Moving) Allowed/Not Allowed, and Hiding Allowed/Not Allowed. Furthermore, the virtual page may be configured of one or more pages, and each page may be set up to have a different authority level.

Figure 12:
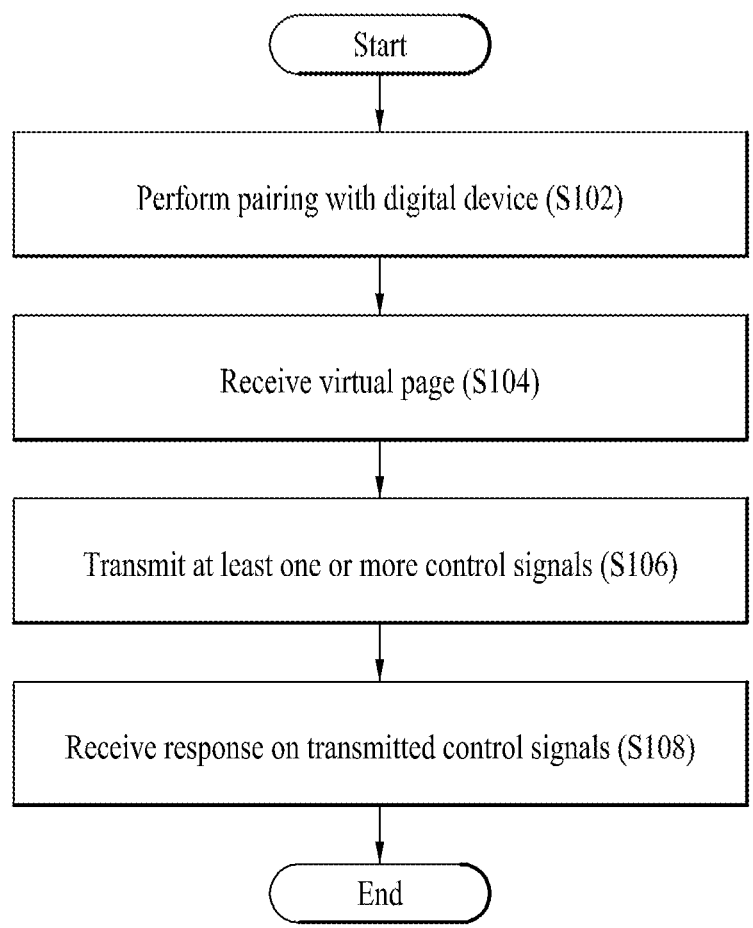
FIG. 12 illustrates a flow chart for describing a method for controlling the digital device according to the present invention.

FIG. 12 illustrates a flow chart for describing a method for controlling the digital device according to the present invention.

Referring to the flow chart shown in FIG. 12, the medium performs a pairing process within a digital device, which is its control target, through a wired and/or wireless network (S102). This process step corresponds to a basic step or a preparatory step for controlling the digital device. And, herein, the pairing process may be performed manually or automatically. Meanwhile, although the term 'pairing' is used in the description of the present invention, the present invention will not be limited only to the terms and examples disclosed herein. Additionally, by having software, such as a specific application, provided in the medium be executed, the connection between the two devices may be established automatically. Meanwhile, such pairing process may also be performed automatically when the power of the medium or digital device is turned on.

The smart key receives a virtual page from the paired digital device (S104).

Thereafter, the smart key then generates at least one or more control signals corresponding to at least one user selection or request, based upon the information on the received virtual page (S106).

Finally, the smart key receives the response corresponding to the control signal, which is transmitted in step S106, from the digital device and then provides the received response to the user (S108).

As described above, the digital device and the method for controlling the same according to the present invention may have the following advantages. Firstly, a digital device having its display turned off may be controlled without having to turn on the display of the corresponding digital device, or may be controlled with minimum power consumption. Secondly, by using a medium, the digital device according to the present invention may be easily and conveniently controlled without having to take out the digital device from the user's pocket, backpack, and so on. And, finally, by promoting convenience in controlling the digital device through a virtual page, the user's satisfaction level on the product (i.e., the digital device) may be increased.

Furthermore, although the drawings have been distinguished and divided in order to facilitate the description of the present invention, the present invention may be designed to form a new embodiment by combining some of the above-described embodiments of the present invention. Moreover, whenever required by anyone skilled in the art, the scope of the present invention includes designing a recording medium readable by a computer, the computer having a program for executing the above-described embodiments of the present invention recorded therein.

The display device and the method for operating the same according to the present invention may not be limited only to the above-described configuration and methods according to the exemplary embodiments of the present invention. Accordingly, variations of the exemplary embodiments of the present invention may be configured by selectively combining each exemplary embodiment of the present invention fully or in part.

Meanwhile, the method of operating the display apparatus according to the present invention may be realized as a code that can be read by a processor provided in the image display device in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. It is also apparent that such variations of the present invention are not to be understood individually or separately from the technical scope or spirit of the present invention.

Also, a device invention and a method invention are both described in this specification of the present invention. Therefore, whenever required, the description of both inventions may be supplementarily applied.

What is claimed is:

1. A method for controlling a digital device having a display, which is turned off, the method comprising:
   connecting an external controlling device to the digital device having the display turned off;
   generating access information for the digital device to be controlled by the connected external controlling device, wherein the access information includes data for at least one of selecting a function, executing an application of the digital device, or controlling an execution of an application which is currently reproduced according to a current status of the digital device;
   receiving a first input signal from the connected external controlling device while the display is turned off;
   transmitting the generated access information to the connected external controlling device in response to the first input signal;
   receiving a second input signal in accordance with the transmitted access information from the connected external controlling device;
   performing at least one of selecting the function, executing the application or controlling the execution of the application which is currently reproduced in response to the second input signal; and
   transmitting resultant data in accordance with the performance in response to the second input signal to the connected external controlling device,
   wherein the turned off display of the digital device is continuously turned off after the external controlling device is connected to the digital device.

2. The method of claim 1, wherein the access information includes link data, so as to be linked to a corresponding function or application within the digital device in accordance with the second input signal, thereby executing the corresponding function or application.

3. The method of claim 1, wherein the first or second input signals are input by at least one of a touch motion performed on the digital device or through a medium being paired with the digital device.

4. The method of claim 3, wherein the connected external controlling device corresponds to any one of a Bluetooth device, a smart device, and another digital device, the connected external controlling device being connected through a network so as to be paired with the digital device.

5. The method of claim 4, wherein the access information is output on the digital device, and wherein a backlight unit of the digital device is turned off and only a touch-screen panel of the digital device is turned on, thereby being output on the touch-screen panel.

6. The method of claim 4, wherein the access information is output only on the connected external controlling device in a form of at least one of text, audio, video, and image.

7. The method of claim 5, further comprising:
   providing unlock data for unlocking the digital device to the connected external controlling device in accordance with the received first or second input signal; and receiving unlock input data of the user in response to the provided unlock data and comparing the received unlock input data and pre-stored unlock data of the user, thereby deciding whether or not to unlock the digital device.

8. The method of claim 7, wherein the unlock data is provided as a black screen in a state when the backlight unit of the digital device is turned off and when only the touch-screen panel of the digital device is turned on, and
wherein the received unlock input data corresponds to at least one of a signature, a specific pattern, a specific alignment of fragments, and unique information or drawing of the user.

9. The method of claim 8, wherein the digital device sets up different authority levels for each of the at least one function or application executable in response to the received second signal, and wherein the authority level includes at least one of Reading/Writing Allowed, Deletion Allowed/Not Allowed, Relocation Allowed/Not Allowed, and Hiding Allowed/Not Allowed.

10. The method of claim 9, wherein the access information is configured of one or more pages, and wherein each page is set up to have a different authority level.

11. A digital device having a display which is turned off, the digital device comprising:
a user input receiver configured to receive a first input signal and a second input signal from an external controlling device which is connected to the digital device while the display of the digital device is turned off;
a controller configured to generate the access information for the digital device to be controlled by the connected external controlling device, wherein the access information includes data for at least one of selecting a function, executing an application of the digital device, or controlling an execution of an application which is currently reproduced according to a current status of the digital device, to transmit the generated access information to the connected external controlling device in response to the first input signal, to perform at least one of selecting the function, executing the application or controlling the execution of the application which is currently reproduced and to transmit resultant data in accordance with the performance in response to the second input signal to the external controlling device; and
an output unit configured to output the access information to the external controlling device in response to the first input signal and to output the resultant data to the external controlling device in response to the second input signal,
wherein the turned off display of the digital device is continuously turned off after the external controlling device is connected to the digital device.

12. The digital device of claim 11, wherein the access information includes link data, so as to be linked to a corresponding function or application within the digital device in accordance with the second user input, thereby executing the corresponding function or application.

13. The digital device of claim 11, wherein the user input receiver receives a user input by at least one performing a touch motion on the digital device or through the external controlling device being paired with the digital device.

14. The digital device of claim 13, wherein the external controlling device corresponds to any one of a Bluetooth device, a smart device, and another digital device, the external controlling device being connected through a network so as to be paired with the digital device.

15. The digital device of claim 14, wherein the controller performs control operations, so as to output the access information and the resultant data on the digital device, and wherein a backlight unit of the digital device is turned off and only a touch-screen panel of the digital device is turned on.

16. The digital device of claim 14, wherein the controller performs control operations, so as to deliver the first data to the external controlling device in a form of at least one of text, audio, video, and image.

17. The digital device of claim 15, wherein the controller performs control operations, so as to provide unlock data unlocking the digital device in accordance with any one of the first or second input signals, receive unlock input data of the user in response to the provided unlock data and
to compare the received unlock input data and unlock data of the user pre-stored in the digital device, thereby deciding whether or not to unlock the digital device.

18. The digital device of claim 17, wherein the unlock data is provided as a black screen in a state when the backlight unit of the digital device is turned off and when only the touch-screen panel of the digital device is turned on, and
wherein the received unlock input data corresponds to at least one of a signature, a specific pattern, a specific alignment of fragments, and unique data or drawing of the user.

19. The digital device of claim 18, wherein the controller sets up different authority levels for each of the at least one function or application executable in response to the received second signal, and wherein the authority level includes at least one of Reading/Writing Allowed, Deletion Allowed/Not Allowed, Relocation Allowed/Not Allowed, and Hiding Allowed/Not Allowed.

20. The digital device of claim 19, wherein the controller sets up a different authority level for each page configuring the access information.

\* \* \* \* \*